(12) United States Patent
Kim et al.

(10) Patent No.: US 10,968,826 B2
(45) Date of Patent: Apr. 6, 2021

(54) COMBINED POWER GENERATION SYSTEM USING PRESSURE DIFFERENCE

(71) Applicant: DOOSAN HEAVY INDUSTRIES & CONSTRUCTION CO., LTD., Changwon-si (KR)

(72) Inventors: Sanghyeun Kim, Yongin-si (KR); Hwachang Sung, Seoul (KR); Songhun Cha, Osan-si (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 98 days.

(21) Appl. No.: 16/112,043

(22) Filed: Aug. 24, 2018

(65) Prior Publication Data
US 2019/0112977 A1 Apr. 18, 2019

(30) Foreign Application Priority Data

Oct. 16, 2017 (KR) .................. 10-2017-0133954

(51) Int. Cl.
*F02C 6/18* (2006.01)
*F03G 7/04* (2006.01)
(Continued)

(52) U.S. Cl.
CPC .............. *F02C 6/18* (2013.01); *F01K 7/32* (2013.01); *F01K 23/10* (2013.01); *F02C 7/185* (2013.01);
(Continued)

(58) Field of Classification Search
CPC ........ F01K 25/08; F01K 25/10; F01K 25/103; F01K 23/10; F01K 7/32; F01K 7/16;
(Continued)

(56) References Cited

U.S. PATENT DOCUMENTS 4,033,135 A * 7/1977 Mandrin ................. F01K 23/02
60/648
4,231,226 A * 11/1980 Griepentrog .............. F17C 9/02
60/648
(Continued)

FOREIGN PATENT DOCUMENTS

CN 105422200 A 3/2016
JP 3597552 A 8/1995
(Continued)

OTHER PUBLICATIONS

A Korean Office Action dated Dec. 19, 2018 in connection with Korean Patent Application No. 10-2017-0133954 which corresponds to the above-referenced U.S. application.
(Continued)

*Primary Examiner* — Mark A Laurenzi
*Assistant Examiner* — Xiaoting Hu
(74) *Attorney, Agent, or Firm* — Invenstone Patent, LLC (57) ABSTRACT

A combined power generation system performing pressure difference power generation includes a pressure difference power generation facility generating electricity by using a pressure change of natural gas; a gas turbine power generation facility including a compressor, a combustor, a turbine, and a generator; and a heating unit to heat the natural gas discharged from the pressure difference power generation facility. A first bypass channel enables the natural gas to bypass the pressure difference power generation facility, and a second bypass channel enables the natural gas to bypass the heating unit. The heated natural gas is heated to a high temperature and then introduced into the combustor of the gas turbine power generation facility. Since the natural gas to be used in the gas turbine power generation facility is preliminarily heated while passing through the preceding
(Continued)

power generation facility, the generation efficiency of the gas turbine power generation efficiency is improved.

10 Claims, 7 Drawing Sheets

(51) Int. Cl.
| | |
|---|---|
| *F02C 7/224* | (2006.01) |
| *F01K 23/10* | (2006.01) |
| *F02C 9/18* | (2006.01) |
| *F02C 7/18* | (2006.01) |
| *F01K 7/32* | (2006.01) |
| *F01K 25/10* | (2006.01) |

(52) U.S. Cl.
CPC ............... *F02C 7/224* (2013.01); *F02C 9/18* (2013.01); *F03G 7/04* (2013.01); *F01K 25/103* (2013.01); *F05D 2220/62* (2013.01); *F05D 2220/76* (2013.01); *F05D 2260/20* (2013.01)

(58) Field of Classification Search
CPC .... F01K 23/06; F02C 6/18; F02C 9/18; F02C 9/52; F02C 7/141; F02C 7/143; F02C 7/18; F02C 7/185; F02C 7/224; F02C 3/22; F02C 3/24; F02C 3/28; F02C 3/04; F02C 6/00; F05D 2220/62; F05D 2220/76; F05D 2260/20; F05D 9/18; F05D 9/52; F03G 7/04
See application file for complete search history.

(56) References Cited

U.S. PATENT DOCUMENTS

| | | | | | |
|---|---|---|---|---|---|
| 4,320,303 | A | * | 3/1982 | Ooka | F01K 25/10 |
| | | | | | 290/1 R |
| 4,444,015 | A | * | 4/1984 | Matsumoto | F01K 23/04 |
| | | | | | 60/641.1 |
| 4,693,072 | A | * | 9/1987 | McLean | F01K 9/003 |
| | | | | | 60/39.182 |
| 4,995,234 | A | * | 2/1991 | Kooy | F01K 25/10 |
| | | | | | 60/648 |
| 5,255,505 | A | * | 10/1993 | Cloyd | F02C 7/185 |
| | | | | | 60/806 |
| 6,374,591 | B1 | * | 4/2002 | Johnson | F01K 23/10 |
| | | | | | 60/783 |
| 6,644,041 | B1 | * | 11/2003 | Eyermann | F17C 9/02 |
| | | | | | 62/50.2 |
| 8,973,398 | B2 | * | 3/2015 | Coyle | F17C 9/02 |
| | | | | | 62/50.2 |
| 9,003,807 | B2 | * | 4/2015 | Chehab | F01D 11/24 |
| | | | | | 60/782 |
| 2003/0213245 | A1 | * | 11/2003 | Yates | F01K 17/02 |
| | | | | | 60/651 |
| 2009/0100845 | A1 | * | 4/2009 | Amir | F01K 25/08 |
| | | | | | 62/50.2 |
| 2015/0377076 | A1 | * | 12/2015 | Giegel | F01K 23/12 |
| | | | | | 60/645 |
| 2016/0003108 | A1 | * | 1/2016 | Held | F01K 23/10 |
| | | | | | 60/517 |
| 2016/0076405 | A1 | * | 3/2016 | Hashimoto | F01K 13/003 |
| | | | | | 60/653 |
| 2016/0363049 | A1 | * | 12/2016 | Rizopoulos | F17C 7/04 |
| 2017/0234266 | A1 | * | 8/2017 | Hwang | F01K 13/02 |
| | | | | | 60/645 |
| 2017/0284307 | A1 | * | 10/2017 | Inoue | F01D 11/24 |

FOREIGN PATENT DOCUMENTS

| | | |
|---|---|---|
| JP | H09-138063 A | 5/1997 |
| JP | H10-288047 A | 10/1998 |
| JP | 2001-081484 A | 3/2001 |
| JP | 2011-032954 A | 2/2011 |
| JP | 2012-255407 A | 12/2012 |
| JP | 2013-194598 A | 9/2013 |
| JP | 2016-061199 A | 4/2016 |
| KR | 10-2011-0047905 A | 5/2011 |
| KR | 10-2017-0034719 A | 3/2017 |
| WO | 2007011921 A2 | 1/2007 |
| WO | 2008-150450 A1 | 12/2008 |

OTHER PUBLICATIONS

A Korean Office Action dated May 16, 2019 in connection with Korean Patent Application No. 10-2017-0133954 which corresponds to the above-referenced U.S. application.

* cited by examiner

COMBINED POWER GENERATION SYSTEM USING PRESSURE DIFFERENCE

CROSS REFERENCE TO RELATED APPLICATIONS

The present application claims priority to Korean Patent Application No. 10-2017-0133954, filed Oct. 16, 2017, the entire contents of which is incorporated herein for all purposes by this reference.

BACKGROUND OF THE INVENTION

Field of the Invention

The present invention relates to a combined power generation system performing pressure difference power generation by using natural gas which flows into a gas turbine generation facility to heat the natural gas to be used in the gas turbine generation facility, and then supplying the resulting heated natural gas to the gas turbine power generation facility, thereby improving power generation efficiency.

Related Art

Natural gas (NG) is a collective term for naturally occurring gases including hydrocarbon gases and non-hydrocarbon gases. Natural gas occurs underground and exists as a gas when it comes out of the ground. Natural gas primarily consists of methane ($CH_4$), which accounts for about 80 to 90%, and other flammable gases such as ethane ($C_2H_6$) and propane ($C_3H_8$) in varying amounts depending on the place of production. Liquefied natural gas (LNG) refers to natural gas artificially liquefied at low temperatures of about −160° C.

Natural gas and oil are extracted from oilfields or gas fields. Extraction is facilitated by fracturing (also called fracking) whereby fluid such as steam, groundwater, seawater, and carbon dioxide is injected into a well bore. The extracted natural gas is delivered as liquefied natural gas (LNG) to consumers. Liquid natural gas delivered to consumers needs to be re-gasified for use at the point of consumption or for further distribution.

Seawater may be used for LNG re-gasification. However, the use of seawater for LNG re-gasification could have an unexpected impact on marine ecosystems. Alternatively, for LNG re-gasification, natural gas may be burned by a burning system to generate heat which is used as energy for LNG re-gasification. This method has a disadvantage of energy waste.

Natural gas is often used as a fuel in power generation facilities requiring the natural gas to be temperature- and pressure-controlled. To this end, a pressure reducing valve has been used to control the pressure of natural gas flowing into such a power generation facility. This decompression process also results in energy loss.

SUMMARY OF THE INVENTION

The present invention has been made in view of the problems occurring in the related art, and an objective of the present invention is to provide a combined power generation system in which natural gas is heated while passing through a difference power generation system, the heated natural gas flows into a gas turbine power generation system, and cold energy of liquefied natural gas (LNG) is used as coolant for a supercritical fluid power generation system. The combined power generation system improves power generation efficiency of both the gas turbine power generation facility and the supercritical fluid power generation facility.

According to one embodiment of the present invention, there is provided a combined power generation system performing pressure difference power generation, and the system may include a pressure difference power generation facility for generating electricity by using a pressure change of natural gas; a gas turbine power generation facility comprising a compressor that takes in and compresses external air to produce compressed air, a combustor that mixes the compressed air and the natural gas discharged from the pressure difference power generation facility and burns the resulting fuel-and-gas mixture to produce a flue gas, a turbine provided with turbine blades rotated by the flue gas, and a generator connected to and rotated by the turbine to generate electricity; and a heating unit configured to heat the natural gas discharged from the pressure difference power generation facility, the heated natural gas being heated to a high temperature and then introduced into the combustor of the gas turbine power generation facility.

The combined power generation system may further include a first bypass channel enabling the natural gas to bypass the pressure difference power generation facility, and a second bypass channel enabling the natural gas to bypass the heating unit.

The heating unit may heat the natural gas with sea water or with an air heater.

According to another embodiment of the present invention, there is provided a combined power generation system performing pressure difference power generation, and the system may include the above pressure difference power generation facility; the above heating unit; the above gas turbine power generation facility; a supercritical fluid power generation facility for generating electricity by using a supercritical working fluid heated by the flue gas produced by the gas turbine power generation facility; a waste-heat recovery heat exchange facility configured such that heat exchange occurs between the flue gas produced by the gas turbine power generation facility and the working fluid to be used in the supercritical fluid power generation facility; and a liquified natural gas (LNG) heat exchange facility in which heat exchange occurs between the working fluid discharged from the supercritical fluid power generation facility and liquefied natural gas so that the working fluid is cooled and the liquid natural gas is heated to be re-gasified into natural gas, the cooled working fluid flowing into the waste-heat recovery heat exchange facility to undergo heating and then flowing into the supercritical fluid power generation facility.

The combined power generation system may further include a working fluid heat exchanger for performing heat exchange between the working fluid having passed through the LNG heat exchange facility and the working fluid discharged from the supercritical fluid power generation facility.

The LNG heat exchange facility may include a mediation fluid circuit unit through which circulates a mediation fluid for mediating heat exchange between the liquid natural gas and the working fluid. A buffering unit may be configured to prevent explosions attributable to the mediation fluid.

The combined power generation system may further include an LNG storage facility for storing the liquid natural gas to be introduced into the LNG heat exchange facility, and the LNG storage facility may include an LNG heating facility configured to heat the stored liquid natural gas for re-gasification of the liquid natural gas.

The combined power generation system may further include an airflow channel configured to deliver a portion of the compressed air from the compressor to the turbine; and a fuel gas heater for performing heat exchange between compressed air from the airflow channel and natural gas flowing into the pressure difference power generation facility, thereby heating the natural gas.

The combined power generation system may further include a branch channel branching off from the airflow channel to allow the compressed air in the airflow channel to bypass the fuel gas heater; and an airflow control valve to regulate a flow rate of air flowing into the fuel gas heater.

The combined power generation system may further include a cooling fan installed in the airflow channel to cool air having passed through the fuel gas heater.

The combined power generation system may further include an air heat exchanger for preforming heat exchange between the working fluid having passed through the LNG heat exchange facility and the working fluid having passed through the fuel gas heater.

According to another embodiment of the present invention, there is provided a combined power generation system performing pressure difference power generation, and the system may include the above pressure difference power generation facility; the above heating unit; the above gas turbine power generation facility; the above supercritical fluid power generation facility; the above LNG heat exchange facility; a first waste-heat recovery heat exchange facility in which heat exchange occurs between the working fluid flowing in a first flow channel after passing through the LNG heat exchange facility and the flue gas produced by the gas turbine power generation facility; and a second waste-heat recovery heat exchange facility in which heat exchange occurs between the flue gas produced by the gas turbine power generation facility and a merged stream of the working fluid flowing in the second flow channel and the working fluid having passed through the first waste-heat recovery heat exchange facility, the merged stream of working fluid passing through the second waste-heat recovery heat exchange facility and flowing into the supercritical fluid power generation facility.

The combined power generation system may further include a first temperature measurement unit for measuring a temperature of the working fluid having passed through the first waste-heat recovery heat exchange facility; and a second temperature measurement unit for measuring a temperature of the working fluid having passed through the working fluid heat exchanger. The working fluid flowing into the second flow channel may have a flow rate regulated according to a difference between the temperatures measured by the first temperature measurement unit and the second temperature measurement unit.

The combined power generation system may further include a flue gas temperature measurement unit for measuring a temperature of the flue gas having passed through the first waste-heat recovery heat exchange facility. The working fluid flowing into the second flow channel may have a flow rate regulated according to the measured flue gas temperature.

The present invention has an effect of increasing the generation efficiency of the gas turbine power generation facility by heating natural gas flowing to the gas turbine power generation facility after passing the natural gas through a pressure difference power generation facility, such that the natural gas is heated before being introduced into the gas turbine power generation facility. Further, the present invention has an effect of improving the power generation efficiency of a supercritical fluid power generation facility by using the cold energy of liquid natural gas, and an effect of re-gasifying liquid natural gas without using an external heat source.

BRIEF DESCRIPTION OF THE INVENTION

DETAILED DESCRIPTION OF THE INVENTION

The present invention may be embodied in many forms and have various embodiments. While specific embodiments of the invention will be described herein below, they are only for illustrative purposes and should not be construed as limiting to the invention. Thus, the invention should be construed to cover not only the specific embodiments but also cover other embodiments and modifications and equivalents to the specific embodiments and other possible embodiments.

The terminology used herein is for the purpose of describing particular embodiments only and is not intended to limit the invention. As used herein, the singular forms "a", "an", and "the" are intended to include the plural forms as well, unless the context clearly indicates otherwise. It will be further understood that the terms "comprises" and/or "comprising", or "includes" and/or "including", when used in this specification, specify the presence of stated features, regions, integers, steps, operations, elements and/or components, but do not preclude the presence or addition of one or more other features, regions, integers, steps, operations, elements, components and/or groups thereof.

Herein below, preferred embodiments of the invention will be described in detail with reference to the accompanying drawings. Throughout the drawings, elements having the same or substantially the same function are denoted by the same reference characters. In describing embodiments of the present disclosure, well-known functions or constructions will not be described in detail when it is determined that they may obscure the spirit of the present disclosure. Further, components not related to description of the present invention are not illustrated in the drawings and like reference numerals are given to like components.

Figure 1A:
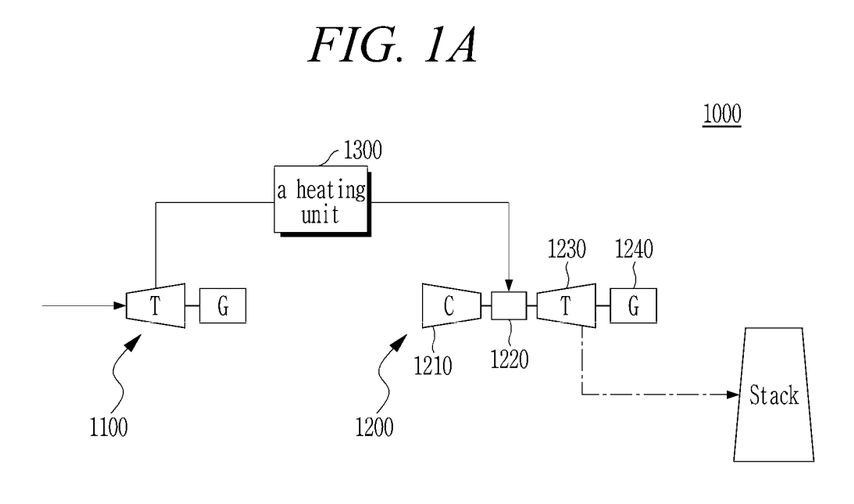
FIG. 1A is a conceptual diagram of a combined power generation system performing pressure difference power generation according to one embodiment of the invention, the system being configured to heat natural gas having passed through a pressure difference power generation facility.
Figure 1B:
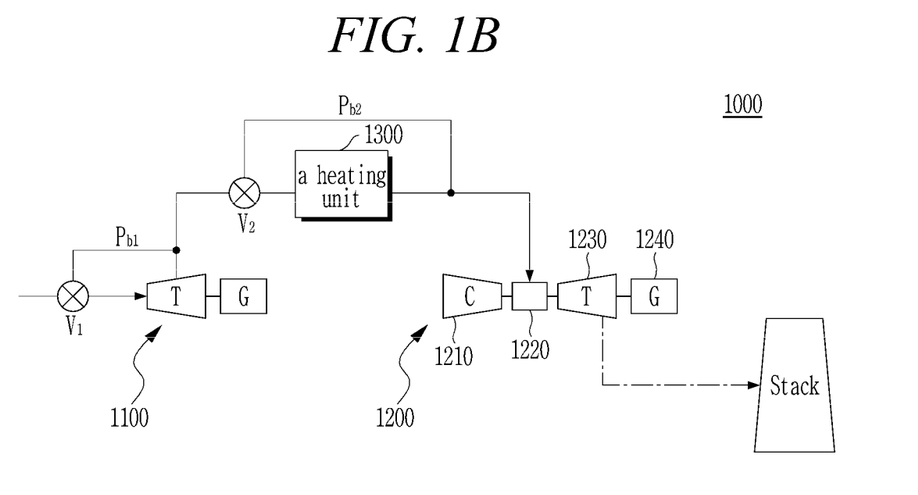
FIG. 1B is a conceptual diagram of a combined power generation system performing pressure difference power generation according to one embodiment of the invention, the system including a first bypass channel allowing a fluid to bypass a pressure difference power generation facility.

FIGS. 1A and 1B each depict a combined power generation system performing pressure difference power generation according to the present invention. The system of FIG. 1A is configured to heat a natural gas (fluid) having passed through a pressure difference power generation facility. The system of FIG. 1B includes a first bypass channel allowing the fluid to bypass the pressure difference power generation facility.

As illustrated in FIG. 1A, according to one embodiment of the present invention, a combined power generation system 1000 generates electricity by using a pressure difference. The combined power generation system 1000 includes a pressure difference power generation facility 1100, a gas turbine power generation facility 1200, and a heating unit 1300.

The pressure difference power generation facility 1100 generates electricity using a pressure change of natural gas (NG). The pressure difference power generation facility 1100 may include a turbine (T) that rotates in response to a decrease in the pressure of the natural gas, and a generator (G) connected to the turbine and generating electricity according to the rotation of the turbine.

The gas turbine power generation facility 1200 generates electricity by burning fuel. The gas turbine power generation facility 1200 may include a compressor 1210, a combustor 1220, a turbine 1230, and a generator 1240. The compressor 1210 takes in and compresses external air to produce compressed air and sends the compressed air to the combustor 1220. The compressed air exiting the compressor 1210 is in a state of high pressure and high temperature. The combustor 1220 mixes fuel, which may be natural gas from the pressure difference power generation facility 1100, with the compressed air supplied from the compressor 1210 and burns the fuel-air mixture to produce a flue gas. The flue gas generated by the combustor is discharged to the turbine 1230. The flue gas rotates turbine blades of the turbine 1230, and the turbine rotates the generator 1240, so that the generator 1240 generates electricity.

The heating unit 1300 heats natural gas having passed through the pressure difference power generation facility 1100. As the natural gas passes through the pressure difference power generation facility 1100, the temperature of the natural gas drops. In one embodiment, the temperature of the natural gas having passing through the pressure difference power generation facility 1100 may be about −30 to −70 degrees. As the natural gas passes through the heating unit 1300, the temperature of the natural gas rises. Therefore, the combustor 1220 of the gas turbine power generation facility 1200 is supplied with the relatively high temperature natural gas. For this reason, the efficiency of the gas turbine power generation facility 1200 is improved.

The heating unit 1300 may take various forms. In one embodiment, the heating unit 1300 may heat natural gas by using seawater. The heating unit 1300 may include a heat exchange facility configured to allow heat exchange between the seawater and the natural gas. In this case, an additional heat source for heating is not necessary.

In another embodiment, the heating unit 1300 may heat the natural gas by using an air heater. When an air heater is used, the temperature of the natural gas can be easily controlled.

In another embodiment of the present invention, as illustrated in FIG. 1B, a first bypass channel Pb1 may be provided to allow the natural gas to bypass the pressure difference power generation facility 1100. The first bypass channel Pb1 may be provided with a first control valve V1 for regulating the flow rate of the natural gas.

When it is unnecessary to have the natural gas pass through the pressure difference power generation facility 1100, the first control valve V1 is controlled such that the natural gas flows through the first bypass channel Pb1. That is, when it is necessary to increase the efficiency of the gas turbine power generation facility 1200, the natural gas needs to directly flow into the gas turbine power generation facility 1200, without flowing by way of the pressure difference power generation facility 1100.

In this embodiment, a second bypass channel Pb2 may be provided to allow the natural gas to bypass the heating unit 1300. The second bypass channel Pb2 may be provided with a second control valve V2 for regulating the flow rate of the natural gas.

Figure 2A:
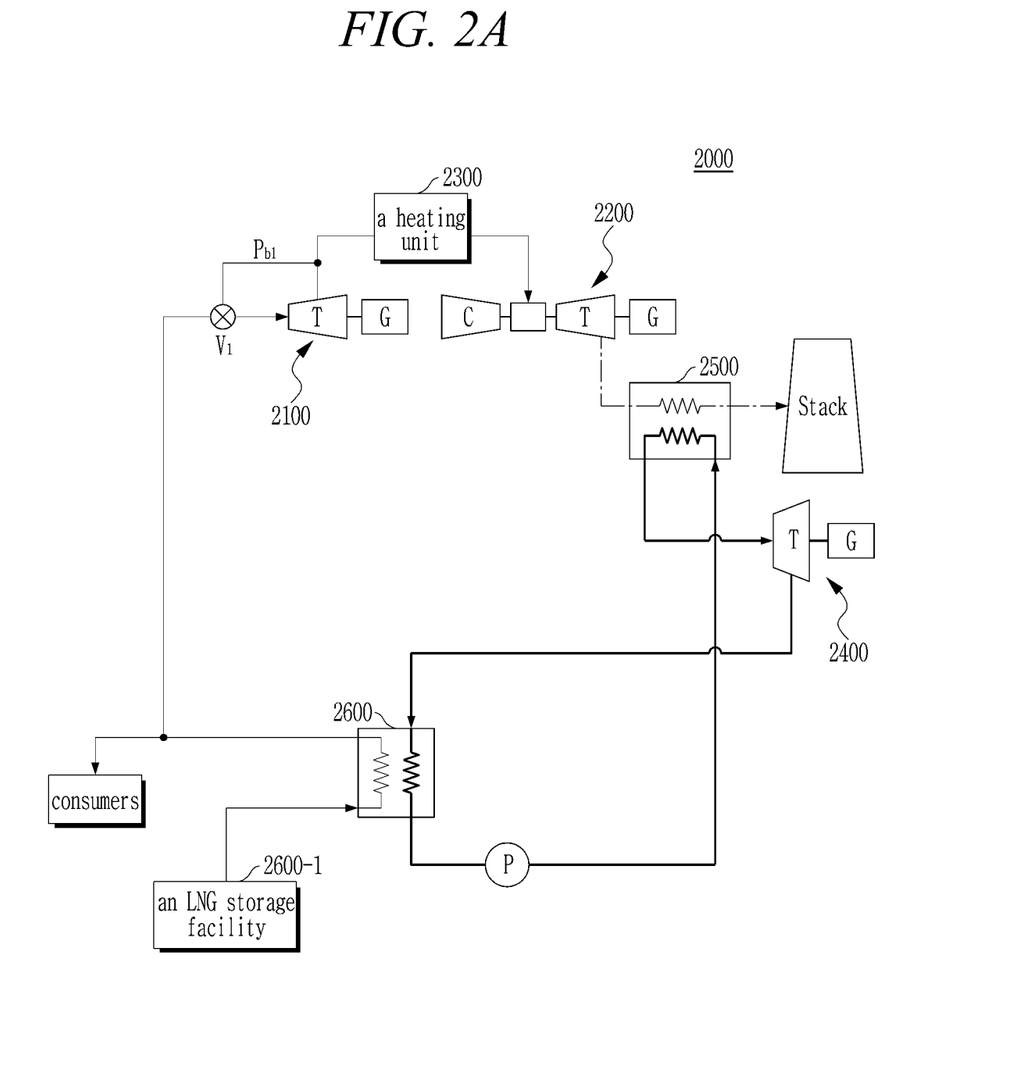
FIG. 2A is a conceptual diagram of a combined power generation system performing pressure difference power generation according to one embodiment of the invention, the system including a supercritical fluid power generation facility.
Figure 2B:
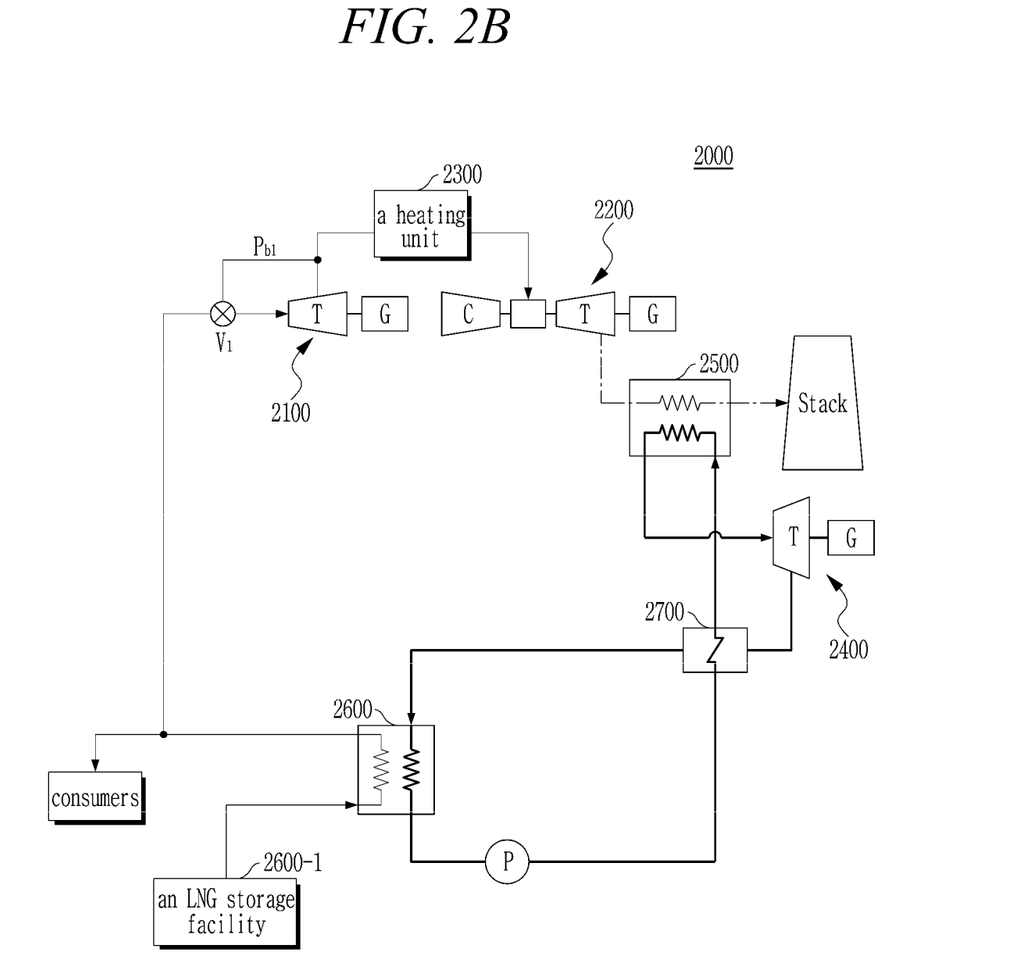
FIG. 2B is a conceptual diagram of a combined power generation system performing pressure difference power generation according to one embodiment of the invention, the system including a working fluid heat exchanger.
Figure 2C:
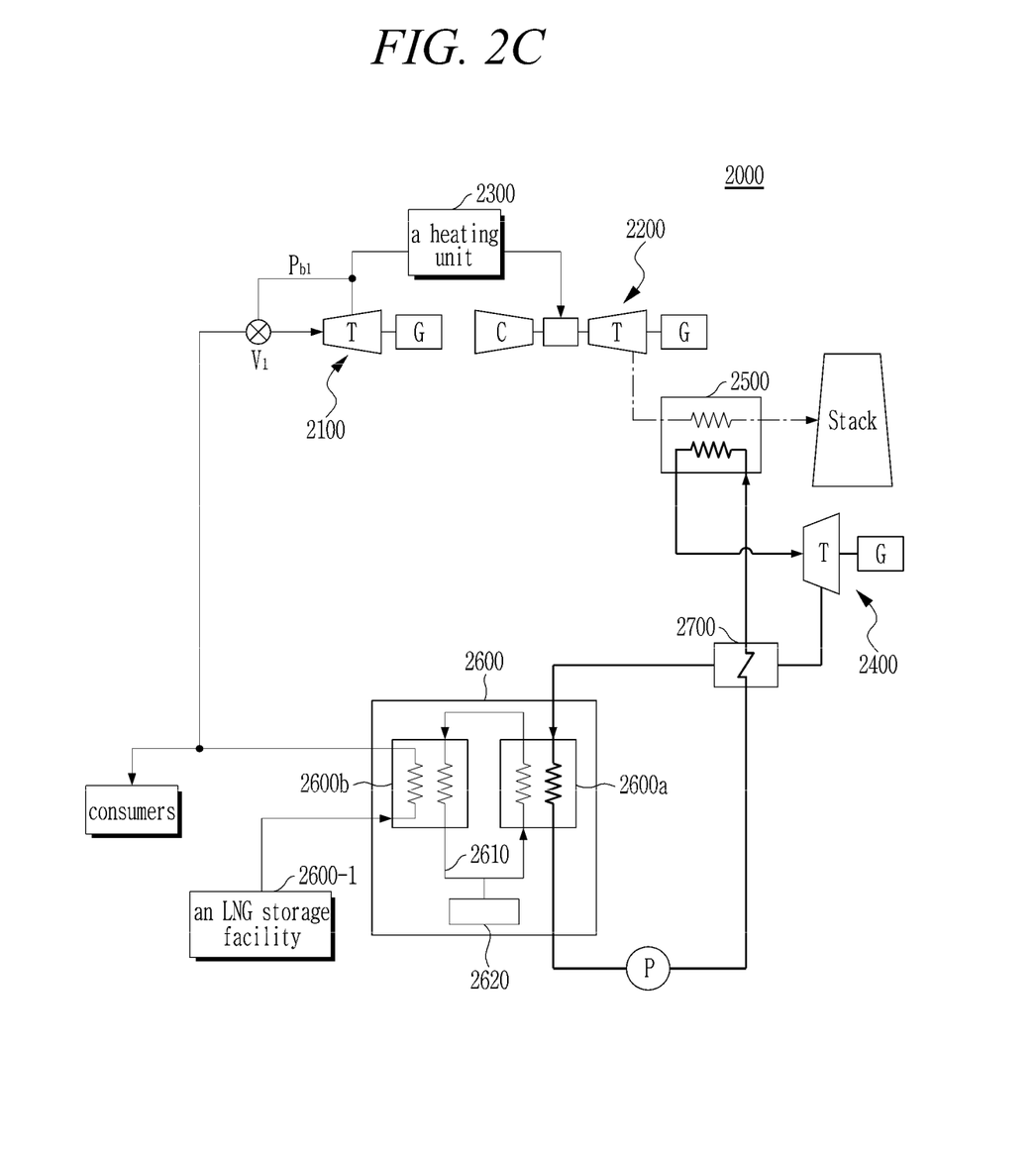
FIG. 2C is a conceptual diagram of a combined power generation system performing pressure difference power generation according to one embodiment of the invention, the system including an LNG heat exchange facility having a mediation fluid circulation unit.

FIGS. 2A, 2B, and 2C each depict a combined power generation system performing pressure difference power generation according to the invention. The system of FIG. 2A includes an LNG heat exchange facility (2600), and the system of FIG. 2B further includes a working fluid heat exchanger (2700). The system of FIG. 2C includes a mediation fluid circulation unit (2610) for the LNG heat exchange facility. The following description of FIGS. 2A to 2C will omit discussion of components having the same structure and function as in FIGS. 1A and 1B.

As illustrated in FIG. 2A, according to one embodiment of the present invention, a combined power generation system 2000 generates electricity using a pressure difference. The combined power generation system 2000 may include a pressure difference power generation facility 2100, a gas turbine power generation facility 2200, a heating unit 2300, a supercritical fluid power generation facility 2400, a waste-heat recovery heat exchange facility 2500, and an LNG heat exchange facility 2600.

The supercritical fluid power generation facility 2400 generates electricity by using a supercritical working fluid heated by the flue gas produced by the gas turbine power generation facility 2200. The supercritical fluid power generation facility 2400 has a closed cycle in which the working fluid used for power generation is not discharged to the outside. Examples of the working fluid include supercritical carbon dioxide, supercritical nitrogen, supercritical argon, and supercritical helium. The working fluid is heated to enter a super critical state of high pressure and high temperature by passing through the waste-heat recovery heat exchange facility 2500, and the "working fluid in the supercritical state" (called supercritical working fluid) drives a turbine (T). The turbine is connected to a generator (G), which is driven by the turbine to generate electricity.

The flue gas discharged from the gas turbine power generation facility 2200 is passed through the waste-heat recovery heat exchange facility 2500 and exchanges heat with the working fluid for use in the supercritical fluid power generation facility 2400. Through the heat exchange, the working fluid of the supercritical fluid power generation facility 2400 is heated to a high temperature.

In the LNG heat exchange facility 2600, heat exchange occurs between the working fluid discharged from the supercritical fluid power generation facility 2400 and liquefied natural gas (LNG), which may be stored in an LNG storage facility 2600-1. To obtain liquefied natural gas for storage, natural gas is extracted from an oil field or a gas field and is then liquefied for transport by, for example, an LNG carrier. The liquid natural gas stored in the LNG storage facility 2600-1 is introduced into the LNG heat exchange facility 2600 and is there re-gasified into natural gas through heat exchange with the working fluid. Re-gasification generally refers to changing liquid natural gas into a gaseous state but also refers to a process of increasing the temperature of liquefied natural gas. In general, re-gasification does not require additional energy.

The LNG storage facility 2600-1 stores liquid natural gas and may be a storage tank established on land or a floating storage facility provided in the sea. In one embodiment, the LNG storage facility 2600-1 may be an LNG carrier. In another embodiment, the LNG storage facility 2600-1 may be a floating storage re-gasification unit (FSRU).

The natural gas resulting from the re-gasification may be supplied to consumers and variously used as fuel. In this embodiment, part of the natural gas flows into the pressure difference power generation facility 2100.

The pressure difference power generation facility 2100 generates electricity by lowering the pressure and temperature of the natural gas. The natural gas having passed through the pressure difference power generation facility 2100 is heated while passing through the heating unit 2300.

The heated natural gas is supplied as fuel to the combustor of the gas turbine power generation facility 2200. The gas turbine power generation facility 2200, which generates electricity by burning natural gas, discharges a flue gas. The discharged flue gas performs heat exchange with the working fluid to be used by the supercritical fluid power generation facility 2400 while passing through the waste-heat recovery heat exchange facility 2500.

Next, the working fluid heated while passing through the waste-heat recovery heat exchange facility 2500 flows into the supercritical fluid power generation facility 2400, and the supercritical fluid power generation facility 2400 generates electricity by using the working fluid that is heated through the heat exchange. The supercritical fluid power generation facility 2400 discharges the working fluid to the LNG heat exchange facility 2600.

In the LNG heat exchange facility 2600, the working fluid performs heat exchange with the liquefied natural gas. Through this heat exchange process, the temperature of the liquefied natural gas rises and the temperature of the working fluid drops. As a result, the liquefied natural gas is re-gasified into natural gas and the working fluid is cooled. The cooled working fluid is sent to the waste-heat recovery heat exchange facility 2500 by a pump (P).

In another embodiment of the present invention, as illustrated in FIG. 2B, the combined power generation system 2000 may further include a working fluid heat exchanger 2700.

In the working fluid heat exchanger 2700, the working fluid discharged from the supercritical fluid power generation facility 2400 and the working fluid discharged from the LNG heat exchange facility 2600 may undergo heat exchange with each other. Through this heat exchange process performed in the working fluid heat exchanger 2700, the working fluid discharged from the LNG heat exchange facility 2600 is heated. The heated working fluid flows into the waste-heat recovery heat exchange facility 2500. In one embodiment, the working fluid heat exchanger 2700 may be a recuperator.

Since the working fluid flows into the waste-heat recovery heat exchange facility 2500 after being heated by the working fluid heat exchanger 2700, the heat exchange efficiency of the waste-heat recovery heat exchange facility 2500 is improved. Accordingly, waste heat utilization efficiency of the gas turbine power generation facility 2200 is improved, and generation efficiency of the supercritical fluid power generation facility 2400 is improved. That is, the overall power generation efficiency of the power generation system is improved.

In another embodiment of the present invention, as illustrated in FIG. 2C, the LNG heat exchange facility 2600 of the combined power generation system 2000 may include a mediation fluid circulation unit 2610. The mediation fluid of the mediation fluid circulation unit 2610 may be a highly stable fluid such as nitrogen, argon, or the like.

The mediation fluid circulation unit 2610 mediates, using the mediation fluid, the heat exchange between the liquid natural gas and the working fluid. The mediation fluid circulates through the mediation fluid circulation unit 2610 and specifically through each of two heat exchangers 2600a and 2600b provided in the mediation fluid circulation unit 2610.

In the first heat exchanger 2600a, the working fluid and the mediation fluid exchange heat with each other. In the second heat exchanger 2600b, the mediation fluid and the liquefied natural gas exchange heat with each other. The mediation fluid gains heat from the working fluid and transfers the heat to the liquefied natural gas. The liquefied natural gas is thus re-gasified into natural gas.

In another embodiment, the LNG heat exchange facility 2600 may include a buffering unit 2620 to prevent explosions resulting from expansion of the mediation fluid. The buffering unit 2620 may include a valve (not shown) to regulate the flow rate of the mediation fluid flowing from the mediation fluid circulation unit 2610 to the buffering unit 2620.

Figure 3A:
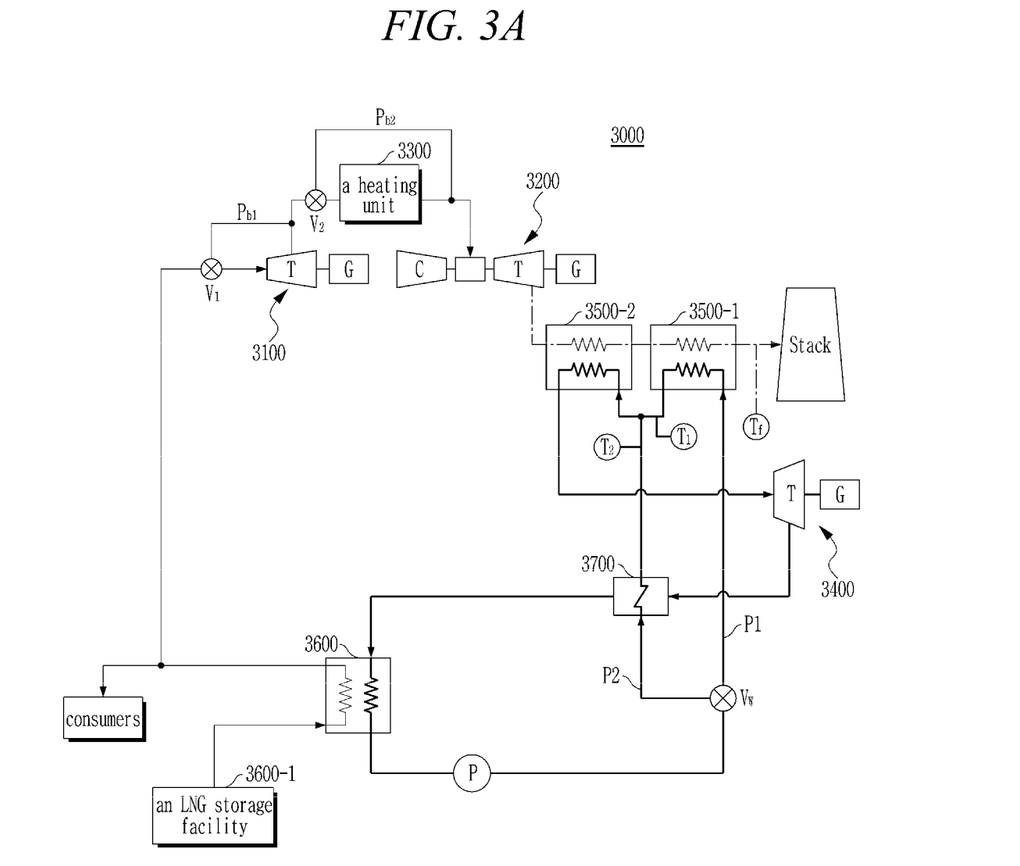
FIG. 3A is a conceptual diagram of a combined power generation system performing pressure difference power generation according to one embodiment of the invention, the system including two waste-heat recovery heat exchange facilities.
Figure 3B:
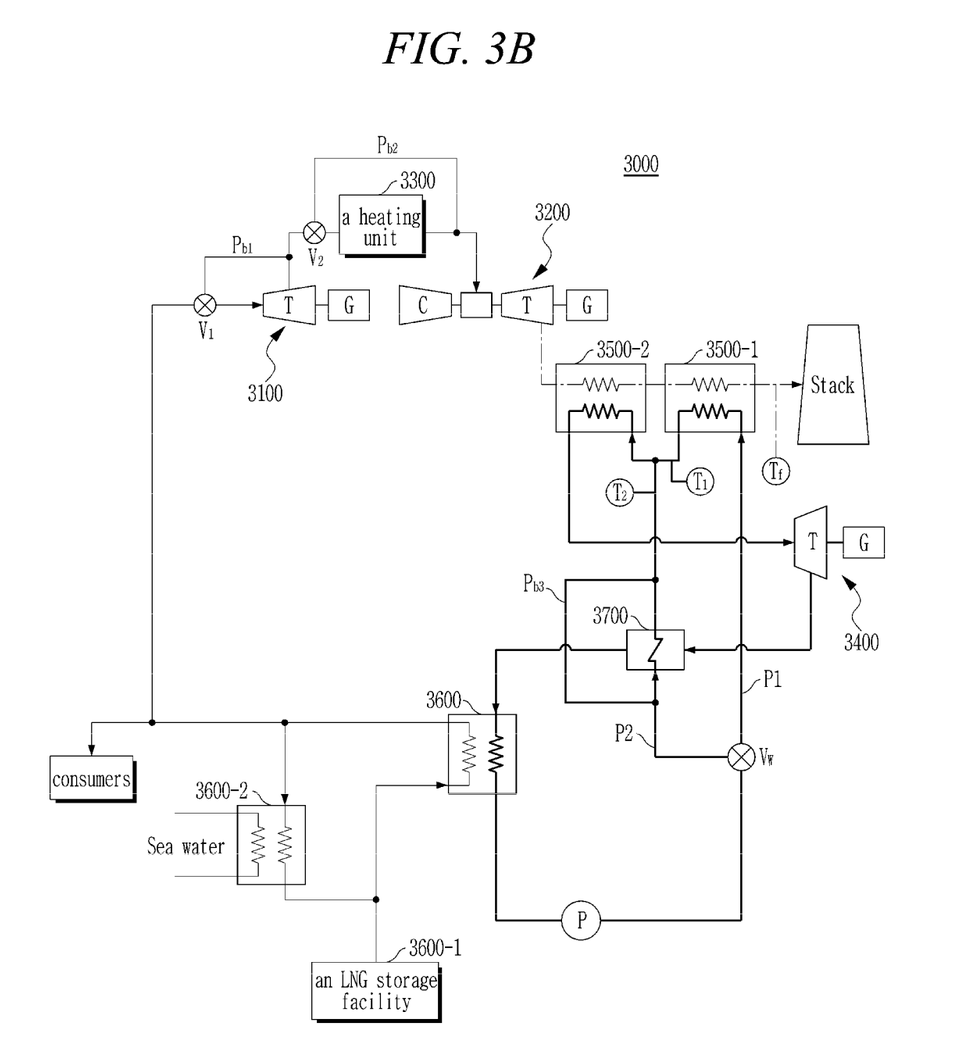
FIG. 3B is a conceptual diagram of a combined power generation system performing pressure difference power generation according to one embodiment of the invention, the system including an LNG heating facility and a natural gas (NG) bypass channel.

FIGS. 3A and 3B each depict a combined power generation system performing pressure difference power generation according to the present invention. The system of FIG. 3A includes two waste-heat recovery heat exchange facilities (3500-1, 3500-2) rather than only one. The system of FIG. 3B includes an LNG heating facility (3600-2) and a third bypass channel (Pb3). The following description of FIGS. 3A and 3B will omit discussion of components having the same structure and function as in FIGS. 2A to 2C.

As illustrated in FIG. 3A, according to one embodiment of the present invention, a combined power generation system 3000 generates electricity using a pressure difference. The combined power generation system 3000 may include a pressure difference power generation facility 3100, a gas turbine power generation facility 3200, a heating unit 3300, a supercritical fluid power generation facility 3400, a first waste-heat recovery heat exchange facility 3500-1, a second waste-heat recovery heat exchange facility 3500-2, an LNG heat exchange facility 3600, and a working fluid heat exchanger 3700.

The first waste-heat recovery heat exchange facility 3500-1 and the second waste-heat recovery heat exchange facility 3500-2 are located in the flue gas flow path along which the flue gas discharged from the gas turbine power generation equipment 3200 flows. The flue gas discharged from the gas turbine power generation facility 3200 sequentially passes through the second waste-heat recovery heat exchange facility 3500-2 and the first waste-heat recovery heat exchange facility 3500-1 and then flows to a stack.

Part of the working fluid discharged from the LNG heat exchange facility 3600 flows into the first waste-heat recovery heat exchange facility 3500-1 via a first flow channel P1 and performs heat exchange with the flue gas produced by the gas turbine power generation facility 3200. The remainder of the working fluid discharged from the LNG heat exchange facility 3600 flows via a second flow channel P2. The working fluid discharged from the first waste-heat recovery heat exchange facility 3500-1 mixes with the working fluid transported through the second flow channel P2, and then the fluid mixture flows into the second waste-heat recovery heat exchange facility 3500-2.

In this way, since the working fluid that is discharged from the LNG heat exchange facility 3600 after undergoing the heat exchange is divided into two streams that respectively flow into the first flow channel P1 and the second flow channel P2, and then respectively undergo heat exchange in the first and second waste-heat recovery heat exchange facilities 3500-1 and 3500-2, the overall heat exchange efficiency is improved.

The combined power generation system 3000 performing pressure difference power generation, according to the present embodiment, further includes a flue gas temperature measurement unit Tf, a first temperature measurement unit T1, a second temperature measurement unit T2, and a working fluid flow control valve Vw.

The flue gas temperature measurement unit Tf measures the temperature of the flue gas having passed through the first waste-heat recovery heat exchange facility 3500-1. The first temperature measurement unit T1 measures the temperature of the working fluid having passed through the first waste-heat recovery heat exchange facility 3500-1. The second temperature measurement unit T2 measures the temperature of the working fluid having passed through the working fluid heat exchanger 3700.

The working fluid flow control valve Vw regulates the flow rate of the working fluid respectively flowing into the first flow channel P1 and the second flow channel P2. In this embodiment, the first valve Vw is configured with one value which is installed at a junction point where the first flow channel P1 and the second flow channel P2 branch off. In another embodiment, the working fluid flow control valve Vw may be configured with two valves that are respectively installed in the first flow channel P1 and the second flow channel P2.

The working fluid flow control valve Vw regulates the flow rate of the working fluid flowing into the first flow channel P1 according to the temperature measured by the flue gas temperature measurement unit Tf. In one embodiment, the working fluid flow control valve Vw increases the flow rate of the working fluid flowing into the first flow channel P1 according to the temperature measured by the flue gas temperature measurement unit Tf. As the flow rate of the working fluid flowing into the first waste-heat recovery heat exchange facility 3500-1 is increased, the heat of the flue gas is increasingly transmitted to the working fluid. After this heat exchange, the temperature of the flue gas temperature measurement unit Tf drops.

Meanwhile, the working fluid control valve Vw regulates the flow rate of the working fluid flowing into the second flow channel P2 according to a difference between the temperatures measured by the first temperature measurement unit T1 and the second temperature measurement unit T2. In one embodiment, the working fluid control valve Vw lowers the flow rate of the working fluid flowing into the second flow channel P2 when the difference the first temperature measurement unit T1 and the second temperature measurement unit T2 increases. Accordingly, the flow rate of the working fluid which is discharged from the LNG heat exchange facility 3600 and then introduced into the working fluid heat exchanger 3700 is reduced. However, the flow rate of the working fluid discharged from the supercritical fluid power generation facility 3400 does not change. Accordingly, the heat exchange efficiency of the working fluid heat exchange facility 3700 is improved, so that the working fluid flowing through the second flow channel P2 can be carrying more heat when introduced into the second waste-heat recovery heat exchange facility 3500-2.

In another embodiment, the working fluid control valve Vw regulates the flow rate of the working fluid such that the difference between the temperatures measured by the first temperature measurement unit T1 and the second temperature measurement unit T2 is maintained under a predetermined temperature differential. The working fluid control valve Vw lowers the flow rate of the working fluid flowing into the second flow channel P2 when the difference between the temperatures measured by the first temperature measurement unit T1 and the second temperature measurement unit T2 exceeds the predetermined temperature differential.

In another embodiment of the present invention, as illustrated in FIG. 3B, the LNG storage facility 3600-1 of the combined power generation system 3000 may include an LNG heating facility 3600-2.

The LNG heating facility 3600-2 heats the liquefied natural gas stored in the LNG storage facility 3600-1 so that the liquefied natural gas is re-gasified into natural gas. To this end, the LNG heating facility 3600-2 is supplied with a hot fluid having a higher temperature than that of the liquefied natural gas and causes heat exchange between the hot fluid and the liquefied natural gas. In one embodiment, the hot fluid may be seawater.

When the gas turbine power generation facility 3200 is not in operation, the working fluid of the supercritical fluid power generation facility 3400 is not heated. That is, in this state, the heat source for re-gasification of the liquid natural gas is not supplied to the LNG heat exchange facility 3600. However, to consistently provide customers with natural gas, that is, including times when the gas turbine power generation facility 3200 is not operating, an additional facility to re-gasify the liquefied natural gas is required. The LNG heating facility 3600-2 may be used in such a case. Alternatively, the LNG heating facility 3600-2 may be utilized when a large amount of natural gas needs to be supplied due to an increase in consumer demand of the natural gas.

In this embodiment, a third bypass channel Pb3 may be connected to the second flow channel P2 so that the working fluid heated through the exchange performed in the LNG heat exchange facility 3600 can bypass the working fluid heat exchanger 3700. When the working fluid heated through the heat exchange in the LNG heat exchange facility 3600 flows through the third bypass channel Pb3, it does not undergo heat exchange with the working fluid discharged from the supercritical power generation facility 3400. Accordingly, the working fluid flowing into the LNG heat exchange facility 3500 maintains a high temperature.

When the amount of the liquefied natural gas to be re-gasified is large, the working fluid flowing into the LNG heat exchange facility 3600 needs to be maintained at a high temperature even when the power generation efficiency of the supercritical fluid power generation facility 3400 is lowered somewhat. In this case, it is necessary to send the working fluid through the third bypass channel Pb3 rather than through the working fluid heat exchanger 3700.

Figure 4:
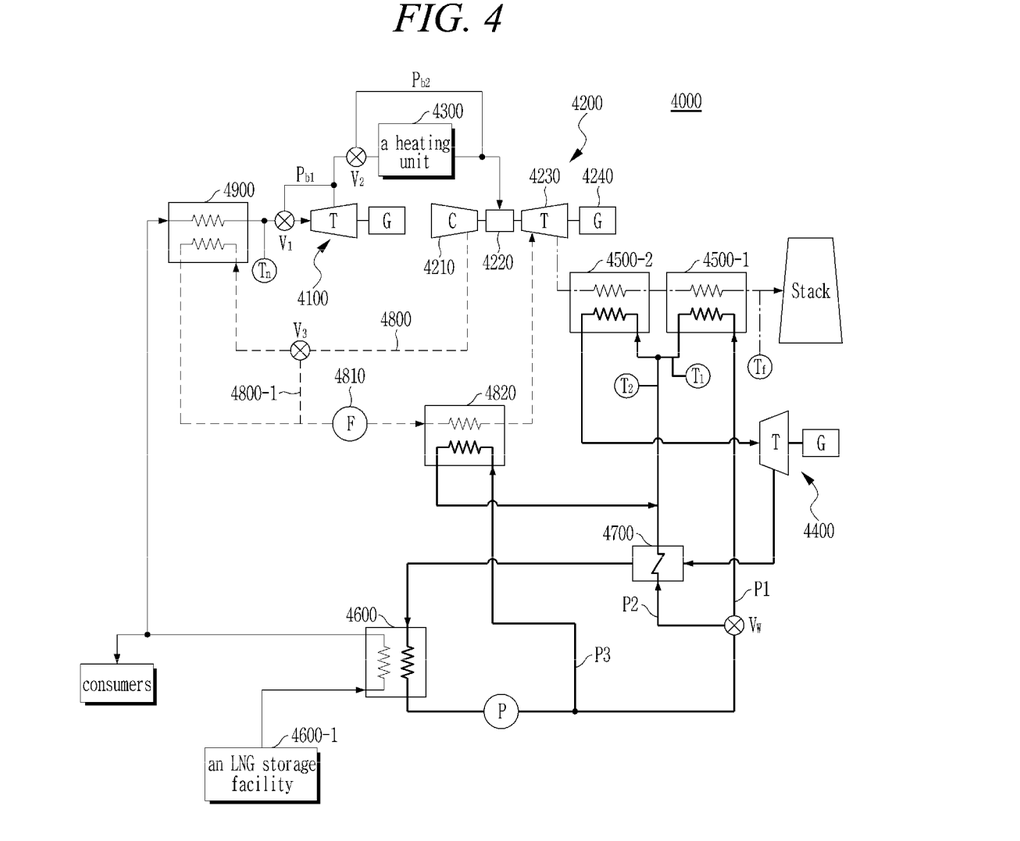
FIG. 4 is a conceptual diagram of a combined power generation system performing pressure difference power generation according to one embodiment of the invention, the system heating natural gas using cooling air discharged from a gas turbine power generation facility.

FIG. 4 depicts a combined power generation system performing pressure difference power generation according to one embodiment of the invention. FIG. 4 is a conceptual diagram of a combined power generation system performing pressure difference power generation, according to one embodiment of the invention, the system heating natural gas using cooling air discharged from a gas turbine power generation facility.

As illustrated in FIG. 4, according to one embodiment of the present invention, a combined power generation system 4000 generates electricity using a pressure difference. The combined power generation system 4000 may include a pressure difference power generation facility 4100, a gas turbine power generation facility 4200, a heating unit 4300, a supercritical fluid power generation facility 4400, a first waste-heat recovery heat exchange facility 4500-1, a second waste-heat recovery heat exchange facility 4500-1, an LNG heat exchange facility 4600, a working fluid heat exchanger 4700, an airflow channel 4800, and a fuel gas heater 4900.

A portion of the compressed air produced by the compressor 4210 of the gas turbine power generation facility 4200 is delivered, via the airflow channel 4800, to the turbine 4230 of the gas turbine power generation facility 4200. The temperature of the air rises during a process in which the air is compressed by the compressor 4210.

In the fuel gas heater 4900, heat exchange occurs between the air introduced into the fuel gas heater 4900 through the airflow channel 4800 and the natural gas which flows into the pressure difference power generation facility 4100. The natural gas having passed through the fuel gas heater 4900 is heated to a high temperature and flows, in a heated state, into the pressure difference power generation facility 4100. On the other hand, the air having performed heat exchange with the natural gas is cooled. The temperature of the natural gas rises while the natural gas is passing through the fuel gas heater 4900, so that the output of the pressure difference power generation facility 4100 increases.

The air having passed through the fuel gas heater 4900 moves to the turbine 4230 of the gas turbine power generation facility 4200. That is, the cooled air discharged from the fuel gas heater 4900 flows into the turbine 4230 of the gas turbine power generation facility 4200 and is used as cooling air for cooling the turbine 4230. In comparison with the case where the compressed air discharged from the compressor 4210 of the gas turbine power generation facility 4200 is directly introduced into the turbine 4230, when the compressed air is introduced into the turbine 4210 via the fuel gas heater 4900 in which the compressed air discharged from the compressor 4210 is cooled by performing heat exchange with natural gas, the effect of cooling the turbine 4230 is enhanced.

In this embodiment, a branch channel 4800-1 may be connected to the airflow channel 4800. When the air discharged from the compressor 4210 of the gas turbine power generation facility 4200 flows through the branch channel 4800-1, it directly flows into the turbine 4230 without flowing by way of the fuel gas heater 4900.

The airflow channel 4800 may be provided with an airflow control valve V3 that regulates the flow rate of air flowing into the fuel gas heater 4900. The airflow control valve V3 may be installed at a junction position where the branch channel 4800-1 branches off from the airflow channel 4800. When the airflow control valve V3 is controlled to lower the flow rate of the air to the fuel gas heater 4900, the flow rate of the air flowing through the branch path 4800-1 increases. In one embodiment, the airflow control valve V3 may be controlled such that there is no air flowing into the fuel gas heater 4900.

In the embodiment, a branch channel 4800 may be equipped with a cooling fan 4810. The cooling fan 4810 is disposed closer to the turbine 4230 of the gas turbine power generation facility 4200 than a point where the air discharged from the fuel gas heater 4900 meets the branch channel 4800-1. When the temperature of the compressed air produced by the compressor 4210 is considerably high, the air may not be sufficiently cooled by the fuel gas heater 4900. In this case, the cooling fan 4810 cools the air which flows into the turbine 4230 of the gas turbine power generation facility 4200, thereby improving an air cooling effect.

In the embodiment, the combined power generation system 4000 may further include an NG temperature measurement unit Tn. The NG temperature measurement unit Tn measures the temperature of the natural gas flowing into the pressure difference power generation facility 4100 via the fuel gas heater 4900. The airflow control valve V3 regulates the flow rate of the air flowing into the fuel gas heater 4900 according to the temperature of the natural gas measured by the NG temperature measuring unit Tn. For example, when the temperature measured by the NG temperature measuring unit Tn is low, the airflow control valve V3 increases the flow rate of the air flowing into the fuel gas heater 4900. In this case, the temperature of the natural gas flowing into the pressure difference generation facility 4100 increases.

In the embodiment, the combined power generation system 4000 may further include an air heat exchanger 4820. In the air heat exchanger 4820, heat exchange occurs between the working fluid that has passed through the LNG heat exchange facility 4600 and the air that flows through the airflow channel 4800. To this end, the air heat exchanger 4820 may be installed on the airflow channel 4800. In the embodiment, the air heat exchanger 4820 is positioned such that its distance to the turbine 4230 of the gas turbine power generation facility 4200 is shorter than the distance of the cooling fan 4810 to the turbine 4230.

In this embodiment, the working fluid that has passed through the LNG heat exchange facility 4600 is divided into three streams respectively flowing into the first flow channel P1, the second flow channel P2, and the third flow channel P3. That is, one stream of the working fluid moves along the first flow channel P1 and then flows into the first waste-heat recovery heat exchange facility 4500-1. Another stream of the working fluid that moves along the second flow channel P2 is heated by undergoing heat exchange with the working fluid discharged from the supercritical fluid power generation facility 4400 in the working fluid heat exchanger 4700, and then flows into the second waste-heat recovery heat exchange facility 4500-2. The remaining stream of the working fluid that moves along the third flow channel P3 is heated by the air heat exchanger 4820 and then flows into the second flow channel P2. In another embodiment, the working fluid that moves along the third flow channel P3 may flow into the first flow channel P1 via the air heat exchanger 4820.

In this way, the air exchanges heat with the working fluid in the air heat exchanger 4820. Thus, the remaining heat of the air can be brought to the supercritical fluid power generation facility 4400. Thus, the power generation efficiency of the supercritical fluid power generation facility 4400 is improved. In addition, the temperature of the air flowing into the turbine of the gas turbine power generation facility 4200 is lowered, resulting in an improvement in the effect of cooling the turbine.

It will be apparent to those skilled in the art that various modifications, additions, and removals of some parts of the present invention may be made without departing from the spirit of the invention as defined in the appended claims, and ones resulting from the modifications, additions, and removals of the parts also will fall into the scope of the present invention.

What is claimed is:

1. A combined power generation system performing pressure difference power generation, the combined power generation system comprising:
   a pressure difference power generation facility for generating electricity by using a pressure change of natural gas;
   a heating unit configured to heat the natural gas discharged from the pressure difference power generation facility;
   a gas turbine power generation facility comprising a compressor that takes in and compresses external air to produce compressed air, a combustor that mixes the compressed air and the natural gas discharged from the heating unit and burns the resulting fuel-and-gas mixture to produce a flue gas, a turbine provided with turbine blades rotated by the flue gas, and a generator connected to and rotated by the turbine to generate electricity;
   a supercritical fluid power generation facility for generating electricity by using a supercritical working fluid heated by the flue gas produced by the gas turbine power generation facility;
   a waste-heat recovery heat exchange facility configured such that heat exchange occurs between the flue gas produced by the gas turbine power generation facility and the working fluid to be used in the supercritical fluid power generation facility;
   a liquefied natural gas (LNG) heat exchange facility in which heat exchange occurs between the working fluid discharged from the supercritical fluid power generation facility and liquefied natural gas so that the working fluid is cooled and the liquefied natural gas is heated to be re-gasified into natural gas, the cooled working fluid flowing into the waste-heat recovery heat exchange facility to undergo heating and then flowing into the supercritical fluid power generation facility; and
   a working fluid heat exchanger for performing heat exchange between the working fluid having passed through the LNG heat exchange facility and the working fluid discharged from the supercritical fluid power generation facility,
   wherein the cooled working fluid from the LNG heat exchange facility flows into the waste-heat recovery heat exchange facility via first and second flow channels formed by a working fluid flow control valve, the cooled working fluid of the second flow channel being supplied to the waste-heat recovery heat exchange facility via the working fluid heat exchanger, such that the working fluid having passed through the LNG heat exchanger is supplied to the waste-heat recovery heat exchange facility via the working fluid flow control valve and the first flow channel and is supplied to the working fluid heat exchanger via the working fluid flow control valve and the second flow channel,
   wherein the combined power generation system further comprises a bypass channel having exactly two ports, the exactly two ports including
      an input port connected to the second flow channel of the working fluid flow control valve, between an output of the working fluid flow control valve and an input of the working fluid heat exchanger, the input of the working fluid heat exchanger provided on the second flow channel, and
      an output port connected to an input of the waste-heat recovery heat exchange facility, between an output of the working fluid heat exchanger and the input of the waste-heat recovery heat exchange facility, and
   wherein the bypass channel enables the working fluid cooled through the heat exchange performed in the LNG heat exchange facility to bypass the working fluid heat exchanger to maintain the working fluid flowing into the LNG heat exchange facility at a high temperature when an amount of the liquefied natural gas to be re-gasified increases,
   the combined power generation system further comprising an LNG storage facility for storing the liquefied natural gas to be introduced into the LNG heat exchange facility,
   wherein the LNG storage facility comprises an LNG heating facility configured to heat the stored liquefied natural gas for re-gasification of the liquefied natural gas,
   wherein the LNG heat exchange facility includes a first LNG path in which heat from the working fluid discharged from the supercritical fluid power generation facility is transferred to the liquefied natural gas supplied from the LNG storage facility and from which heated liquefied natural gas of the first LNG path is output to the pressure difference power generation facility, and
   wherein the LNG heating facility includes a second LNG path in which the liquefied natural gas supplied from the LNG storage facility via the LNG heat exchange facility is heated by sea water and from which the liquefied natural gas heated by the sea water is supplied to an input of the first LNG path.

2. The combined power generation system according to claim 1, wherein the LNG heat exchange facility comprises a mediation fluid circulation unit through which circulates a mediation fluid for mediating heat exchange between the liquefied natural gas and the working fluid.

3. The combined power generation system according to claim 2, further comprising a buffering unit configured to prevent explosions attributable to the mediation fluid.

4. The combined power generation system according to claim 1, further comprising:
   an airflow channel configured to deliver a portion of the compressed air from the compressor to the turbine; and
   a fuel gas heater for performing heat exchange between compressed air from the airflow channel and natural gas flowing into the pressure difference power generation facility, thereby heating the natural gas.

5. The combined power generation system according to claim 4, further comprising:
   a branch channel branching off from the airflow channel to allow the compressed air in the airflow channel to bypass the fuel gas heater; and
   an airflow control valve to regulate a flow rate of air flowing into the fuel gas heater.

6. The combined power generation system according to claim 4, further comprising a cooling fan installed in the airflow channel to cool air having passed through the fuel gas heater.

7. The combined power generation system according to claim 4, further comprising an air heat exchanger for performing heat exchange between the working fluid having passed through the LNG heat exchange facility and the compressed air having passed through the fuel gas heater.

8. The combined power generation system according to claim 1,
wherein the waste-heat recovery heat exchange facility comprises:
a first waste-heat recovery heat exchange facility in which heat exchange occurs between the working fluid flowing in the first flow channel after passing through the LNG heat exchange facility and the flue gas produced by the gas turbine power generation facility; and
a second waste-heat recovery heat exchange facility in which heat exchange occurs between the flue gas produced by the gas turbine power generation facility and a merged stream of the working fluid flowing in the second flow channel and the working fluid having passed through the first waste-heat recovery heat exchange facility, the merged stream of working fluid passing through the second waste-heat recovery heat exchange facility and flowing into the supercritical fluid power generation facility, and
wherein the input of the waste-heat recovery heat exchange facility that is provided on the second flow channel includes the merged stream, such that the output port of the bypass channel is connected between the working fluid heat exchanger and the merged stream.

9. A combined power generation system performing pressure difference power generation, the combined power generation system comprising:
a pressure difference power generation facility for generating electricity by using a pressure change of natural gas;
a heating unit configured to heat the natural gas discharged from the pressure difference power generation facility;
a gas turbine power generation facility comprising a compressor that takes in and compresses external air to produce compressed air, a combustor that mixes the compressed air and the natural gas discharged from the heating unit and burns the resulting fuel-and-gas mixture to produce a flue gas, a turbine provided with turbine blades rotated by the flue gas, and a generator connected to and rotated by the turbine to generate electricity;
a supercritical fluid power generation facility for generating electricity by using a supercritical working fluid heated by the flue gas produced by the gas turbine power generation facility;
a working fluid flow control valve (Vw) configured to regulate a flow of the supercritical working fluid in the supercritical fluid power generation facility into a first flow channel and a second flow channel and installed at a junction point where the first flow channel and the second flow channel branch off from each other;
a working fluid heat exchanger for performing heat exchange between the working fluid flowing along the second flow channel and a portion of the working fluid discharged from the supercritical fluid power generation facility;
a liquefied natural gas (LNG) heat exchange facility in which heat exchange occurs between the working fluid having passed through the supercritical fluid power generation facility and liquefied natural gas so that the working fluid is cooled and the liquefied natural gas is heated to be re-gasified into natural gas;
a first waste-heat recovery heat exchange facility in which heat exchange occurs between the working fluid flowing in the first flow channel after passing through the LNG heat exchange facility and the flue gas produced by the gas turbine power generation facility;
a first temperature measurement unit for measuring a temperature of the working fluid having passed through the first waste-heat recovery heat exchange facility;
a second temperature measurement unit for measuring a temperature of the working fluid having passed through the working fluid heat exchanger; and
a second waste-heat recovery heat exchange facility in which heat exchange occurs between the flue gas produced by the gas turbine power generation facility and a merged stream of the working fluid flowing in the second flow channel and the working fluid having passed through the first waste-heat recovery heat exchange facility, the merged stream of working fluid passing through the second waste-heat recovery heat exchange facility and flowing into the supercritical fluid power generation facility,
wherein the working fluid flow control valve is further configured to lower a flow rate of the working fluid flowing into the second flow channel when a difference between the temperatures measured by the first temperature measurement unit and the second temperature measurement unit increases, and
wherein the combined power generation system further comprises:
an airflow channel configured to deliver a portion of the compressed air from the compressor to the turbine;
a fuel gas heater for performing heat exchange between compressed air from the airflow channel and natural gas flowing into the pressure difference power generation facility, thereby heating the natural gas;
an air heat exchanger for performing heat exchange between the working fluid having passed through the LNG heat exchange facility and the compressed air having passed through the fuel gas heater;
a branch channel branching off from the airflow channel, the branch channel configured to allow the compressed air in the airflow channel to bypass the fuel gas heater and to supply the compressed air of the bypass channel to the air heat exchanger;
an airflow control valve disposed in the airflow channel between the compressor and the fuel gas heater, the airflow control valve configured to regulate a flow rate of air flowing into the fuel gas heater and to regulate a flow rate of air flowing into the branch channel; and
a cooling fan installed in the airflow channel between the branch channel and the air heat exchanger, the cooling fan configured to cool air having passed through the fuel gas heater and air having passed through the branch channel and to supply the cooled air to the air heat exchanger.

10. The combined power generation system according to claim 9, further comprising a flue gas temperature measurement unit for measuring a temperature of the flue gas having passed through the first waste-heat recovery heat exchange facility,
wherein the working fluid flowing into the first flow channel has a flow rate regulated according to the measured flue gas temperature.

* * * * *